United States Patent [19]
Norikazu

[11] Patent Number: 4,613,212
[45] Date of Patent: Sep. 23, 1986

[54] OBJECTIVE LENS FOR OPTICAL DISK

[75] Inventor: Arai Norikazu, Komae, Japan

[73] Assignee: Konishiroku Photo Industry Co., Ltd., Tokyo, Japan

[21] Appl. No.: 700,760

[22] Filed: Feb. 12, 1985

[30] Foreign Application Priority Data

Feb. 29, 1984 [JP] Japan .................. 59-36145

[51] Int. Cl.$^4$ .................. G02B 13/18; G02B 21/02
[52] U.S. Cl. ...................... 350/432; 350/414
[58] Field of Search ............... 350/432, 414, 433–435

[56] References Cited

U.S. PATENT DOCUMENTS 2,388,119  10/1945  Burch ........................ 350/432 X
4,027,952  6/1974   Hugues ...................... 350/432
4,449,792  5/1984   Arai et al. ................. 350/432

Primary Examiner—John K. Corbin
Assistant Examiner—Scott J. Sugarman
Attorney, Agent, or Firm—Jordan B. Bierman

[57] ABSTRACT

An objective lens for an optical disk, particularly a lens of the type which is directly driven for tracking will suffice to be satisfied with a spherical aberration and additional sine conditions. However, it is required that working distance is long and cost is low. These requirements are satisfied by designing an objective lens as a single lens, selecting a shape and thickness of the lens and making one surface thereof aspherical.

Let $r_1$ be the radius of curvature of the lens surface, n the refractive index, f the focal distance, NA the numerical aperture and $\Delta$ the displacement of surface due to aspherical surface, the condition is given by $$0.38 < \frac{r_1}{n \cdot f} < 0.48$$

$$1.7 < n$$

$$0.08 < \frac{(n-1)^2}{(NA)^4} \cdot \frac{\Delta l}{f} < 0.15$$

8 Claims, 7 Drawing Figures

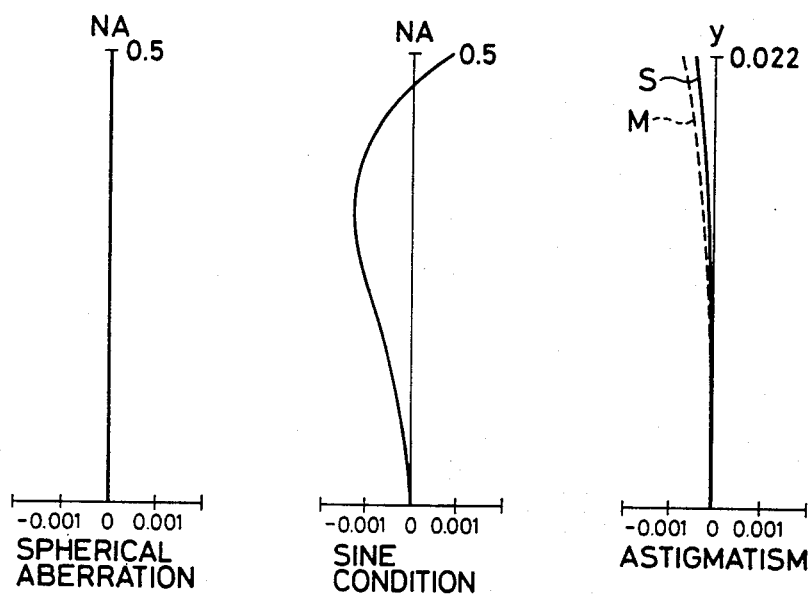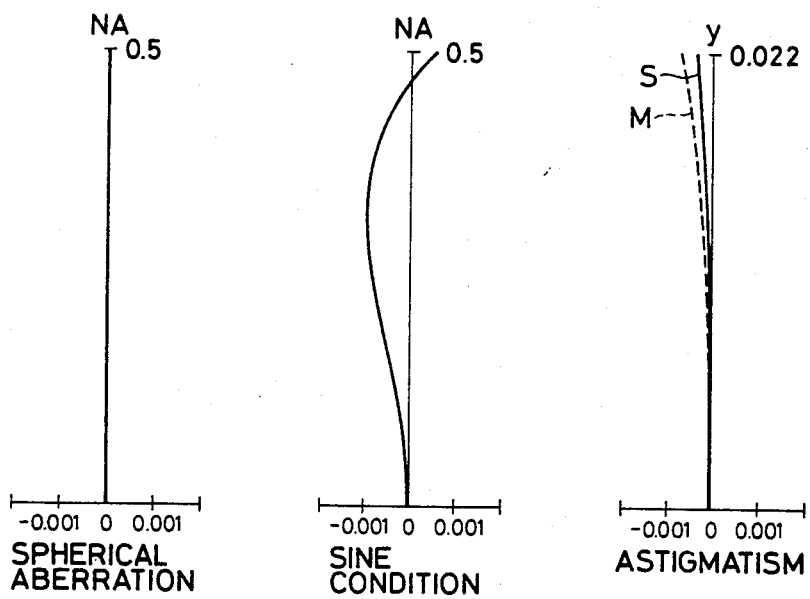

OBJECTIVE LENS FOR OPTICAL DISK

BACKGROUND OF THE INVENTION

1. Field of the Invention

This invention relates to an objective lens for a disk regenerative optical system, and particularly to an objective lens directly driven for tracking.

2. Description of the Prior Art

Where a semiconductor laser is used as a light source, an objective lens used for regeneration of a videodisk or digital audiodisk must have a large aperture of about NA 0.45–0.5 and on-the-axis aberration need be held within a diffraction limit.

In these regenerative optical systems, where the objective lens is directly driven for tracking, an optical axis of the objective lens is always maintained vertically to the disk surface and moved parallel to the disk surface. Therefore, in principle, it is not necessary to correct off-axis aberration. Of course, it would be necessary to correct the sine sondition to some extent to minimize deterioration of performance due to error in mounting a light source, an objective lens, etc.

In order to directly drive the objective lens for tracking, the objective lens has to be disigned as small and as light as possible, and woring distance thereof has to be made sufficiently lengthy so that the disk may not contact therewith even if surface deviation of the disk should occur during rotation.

In order to achieve such an object, lens group has been put to practical use wherein it comprises 3 or 4 spherical glass lenses, the focal length is 4 to 5 mm, and working distance is about 2 mm. However, this lens group requires many lenses and it contains much difficulty so as to satisfy the required diffraction limit, performance when it is manufactured. Furthermore it is difficult to lower the manufacturing cost.

In the existing circumstances, therefore, the price of the objective lens among the prices of regenerative optical systems of videodisk and digital audiodisks accounts for great percent. In order to spread regenerative apparatus of videodisk and digital audiodisk by cost-down, considerable cost-down of the objective lens is required.

Recently, it becomes possible to make a refraction surface aspherical to thereby satisfy the diffraction limit performance despite a single lens, and an attempt has been made to use this for the regenerative objective lens of videodisk and digital audiodisk. In such a single lens, if a spherical surface is used for one refraction surface, it will be very advantageous in working and measurement.

Such an objective lens has been known from the first embodiment in Japanese Patent Laid-Open Nos. 17409/83, 68711/83 and the like. However, in these well-known examples, tracking is carried out by swinging a galvanometer, and correction of aberration required is different and working distance is short. In the latter patent, correction of sine condition is insufficient.

SUMMARY OF THE INVENTION

This invention is intended to provide an objective lens directly driven particularly for tracking, in which one surface thereof is made aspherical thereby to correct on-the-axis aberration within a diffraction limit and correct also sine condition to the extent which poses no problem in practical use.

An objective lens in accordance with the present invention comprises a positive meniscus lens or flat convex lens whose convex surface is directed towards the object and a surface on the object side is an aspherical surface, characterized in that the following conditions are satisfied:

$$0.38 < \frac{r1}{nf} < 0.48 \tag{1}$$

$$1.7 < n \tag{2}$$

$$0.08 < \frac{(n-1)^3}{(NA)^4} \cdot \frac{\Delta l}{f} < 0.15 \tag{3}$$

where
f: focal length of whole system
n: refractive index of lens
r1: vertex radius of curvature of surface on object side
NA: numerical aperture of lens
$\Delta 1$: Difference in a direction of optical axis at the extreme peripheral position of effective diameter of said aspherical surface, between aspherical surface on the object side and the reference spherical surface having radius of curvature $r_1$ which contacts with the vertex of the aspherical surface $\Delta_1$ is positive when radius of curvature of said aspherival surface becomes weak as it is moved away from the optical axis.

The condition (1) is provided to correct the sine condition it place it in good condition in terms of practical use. If the value exceeds the upper limit to assume a large value, the sine condition is over. To correct this, the thickness of lens has to be increased greatly. Conversely, if the value exceeds the lower value to assume a small value, the sine condition is under.

The condition (2) is provided to minimize inflation at an intermediate ring zone of the sine condition. If the value exceeds the lower limit to assume a small value, the sine condition greatly inflates towards the under at the intermediate fing zone.

The condition (3) is provided to regulate an amount of asphericity in the extreme and side of effective diameter (expressed by NA.f) of surface on the object side. If the value exceeds the upper limit to assume a large value, the spherical aberration is over, and conversely, if the value exceeds the lower limit to assume a small value, the spherical aberration is under.

Furthermore, it is desired that with respect to the thickness d of lens, the following condition is satisfied.

$$0.2 < d/f < 0.75 \tag{4}$$

If the value exceeds said upper limit to assume a large value, it is advantageous to correct astigmatism but working distance becomes short, and it will be disadvantageous to use it as a regenerative optical system which directly drives an objective lens for tracking. Conversely, if the value exceeds the lower limit to assume a small value, the end thickness of lens becomes short, in case of large aperture in which NA is 0.45–0.50, resulting in a lens which is very difficult to make.

BRIEF DESCRIPTION OF THE DRAWINGS

FIGS. 2 to 7 show aberrations in first to sixth embodiments, respectively.

DETAILED DESCRIPTION OF THE PREFERRED EMBODIMENTS

Figure 1:
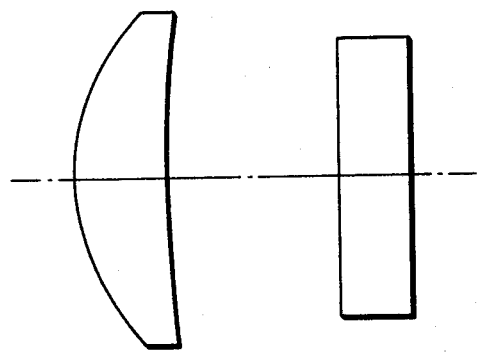
FIG. 1 is a sectional view showing one embodiment of an objective lens in accordance with the present invention.
Figure 2:
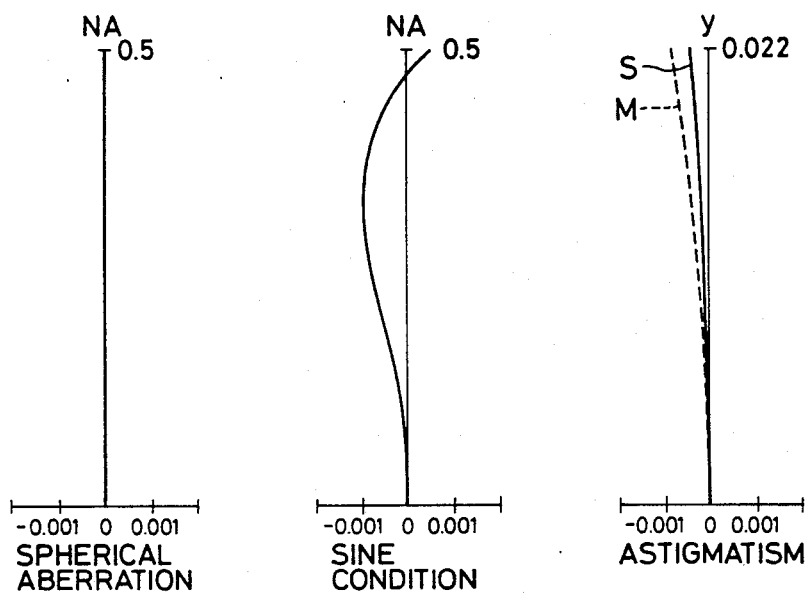
Figure 3:
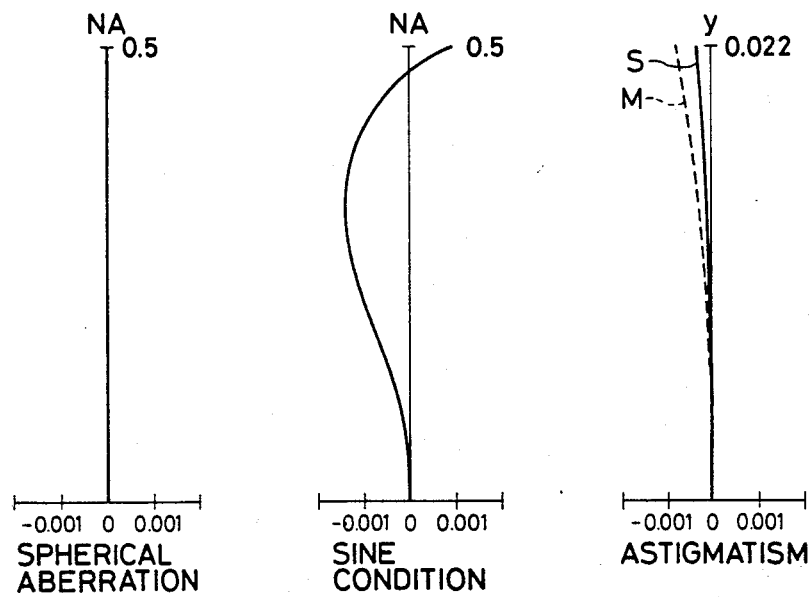
Figure 4:
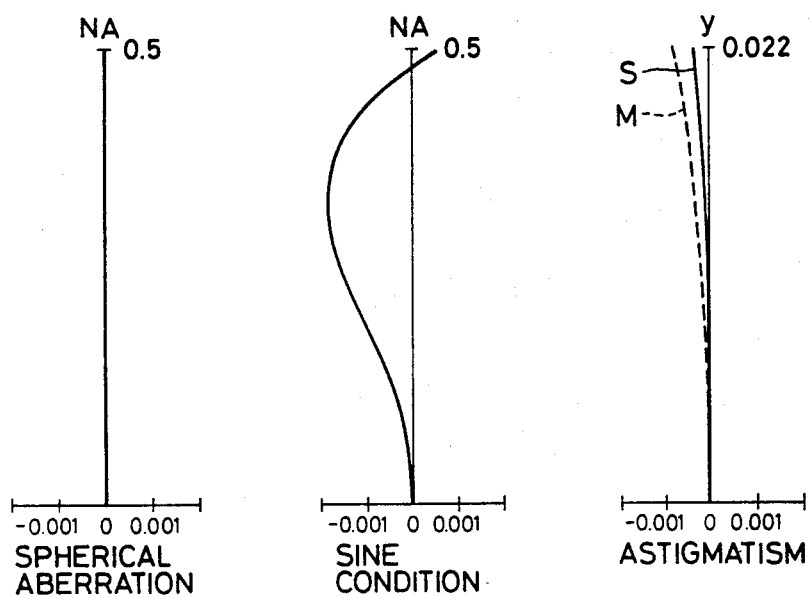
Figure 5:
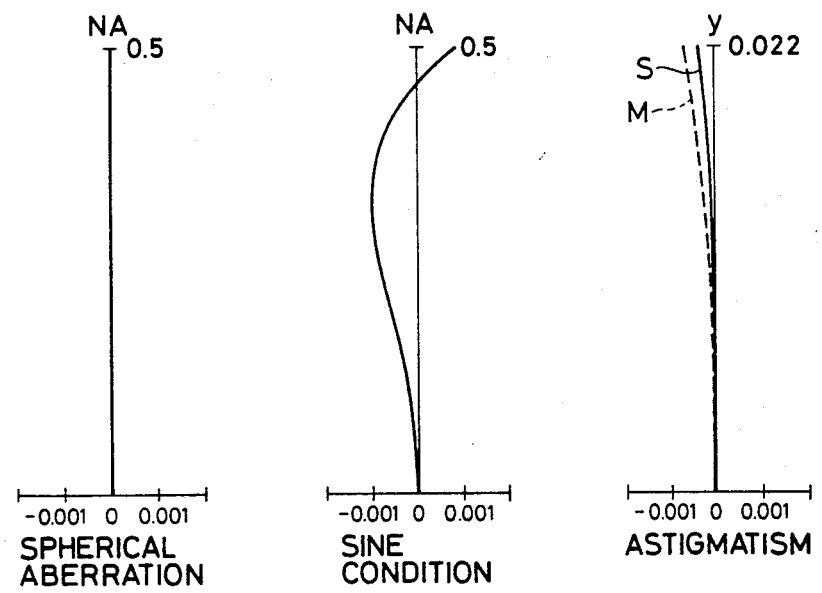

In the following, the embodiments of the present invention will be described.

In the symbols in the tables, r1: radius of curvature of surface on the object side, r2: radius of curvature of surface on the image side, d: on-the-axis thickness of lens, n: refractive index of lens, νd: Abbe number in line d, $d_c$: on-the-axis thickness of cover glass C (refractive index of cover glass with respect to 780 nm wave length light is 1.51072), M: magnification, WD: working distance. In rectangular coordinates (X, Y, Z) with a vertex of surface made as an original point and with a direction of optical axis made as axis X, the aspherical shape of the first surface is given by $$X = \frac{\frac{1}{r1} \phi^2}{1 + \sqrt{1 - (1+k)\left(\frac{\phi}{r1}\right)^2}} + \sum_{i=1}^{4} A_i \phi^{P_i}$$

$$\phi = \sqrt{Y^2 + Z^2}$$

where K: conical constant, $A_1, A_2, A_3, A_4$: aspherical coefficient, $P_1, P_2, P_3, P_4$: power number of aspherical surface.

At this time, $$l = X_{SP} - X_{AS}$$

where $$X_{AS} = \frac{\frac{1}{r1}(NA)f^2}{1 + \sqrt{1 - (1+k)\left(\frac{(NA)f}{r1}\right)^2}} + \sum_{i=1}^{4} A_i\{(NA)f\}^{P_i}$$

$$X_{Sp} = \frac{\frac{1}{r1}\{(NA)f\}^2}{1 + \sqrt{1 - \left(\frac{(NA)f}{r1}\right)^2}}$$

Embodiment 1 f = 1.0   NA = 0.50
$d_c$ = 0.2667   M = 0   WD = 0.6241
$r_1$ = 0.75570   d = 0.3333   n = 1.82496   $v_d$ = 23.8
$r_2$ = 7.20604

Aspherical coefficient. power number
First surface
K = −4.52123D-01
A1 = −5.40998D-03   P1 = 4.0000
A2 = −2.36933D-02   P2 = 6.0000
A3 = −2.41649D-02   P3 = 3.0000
A4 = −4.63059D-02   P4 = 10.0000
$r_1/nf$ = 0.4141   d/f = 0.3333

$$\frac{(n-1)^3}{(NA)^4} \frac{\Delta l}{F} = 0.1183$$

Embodiment 2 f = 1.0   NA = 0.5
$d_c$ = 0.2667   M = 0   WD = 0.6269
$r_1$ = 0.71995   d = 0.3333   n = 1.73814   $v_d$ = 27.5
$r_2$ = 23.46794

Aspherical coefficient. power number
First surface
K = −4.19384D-01
A1 = −3.73982D-02   P1 = 4.0000
A2 = −7.06491D-02   P2 = 6.0000
A3 = −6.62687D-02   P3 = 8.0000
A4 = −1.41617D-01   P4 = 10.0000
$r_1/nf$ = 0.4142   d/f = 0.3333

$$\frac{(n-1)^3}{(NA)^4} \frac{\Delta l}{f} = 0.1153$$

Embodiment 3 f = 1.0   NA = 0.5
$d_c$ = 0.2667   M = 0   WD = 0.6277
$r_1$ = 0.70214   d = 0.3333   n = 1.70214   $v_d$ = 29.5
$r_2$ = ∞

Aspherical coefficient. power number
First surface
K = −4.24200D-01
A1 = −4.75156D-02   P1 = 4.0000
A2 = −9.04006D-02   P2 = 6.0000
A3 = −8.79901D-02   P3 = 8.0000
A4 = −1.72387D-01   P4 = 10.0000
$r_1/nf$ = 0.4125   d/f = 0.3333

$$\frac{(n-1)^3}{(NA)^4} \frac{\Delta l}{f} = 0.1148$$

Embodiment 4 f = 1.0   NA = 0.50
$d_c$ = 0.2667   M = 0   WD = 0.5626
$r_1$ = 0.77006   d = 0.4444   n = 1.82496   $v_d$ = 23.8
$r_2$ = 8.55304

Aspherical coefficient. power number
First surface
K = −3.99415D-01
A1 = −2.12212D-02   P1 = 4.0000
A2 = −3.98149D-02   P2 = 6.0000
A3 = −3.65016D-02   P3 = 8.0000
A4 = −6.67369D-02   P4 = 10.0000
$r_1/nf$ = 0.4220   d/f = 0.4444

$$\frac{(n-1)^3}{(NA)^4} \frac{\Delta l}{f} = 0.1115$$

Embodiment 5 f = 1.0   NA = 0.50
$d_c$ = 0.2667   M = 0   WD = 0.4507
$r_1$ = 0.80831   d = 0.6667   n = 1.82496   $v_d$ = 23.6
$r_2$ = 25.11574

Aspherical coefficient. power number
First surface
K = −7.86967D-01
A1 = 6.75680D-02   P1 = 4.0000
A2 = 1.44711D-02   P2 = 6.0000
A3 = −9.21497D-03   P3 = 8.0000
A4 = −1.44904D-02   P4 = 10.0000
$f_1/nf$ = 0.4429   d/f = 0.6667

-continued $$\frac{(n-1)^3}{(NA)^4} \frac{\Delta 1}{f} = 0.0976$$

Embodiment 6

| | | |
|---|---|---|
| f = 1.0 | NA = 0.50 | |
| $d_c$ = 0.2667 | M = 0 | WD = 0.6884 |
| $r_1$ = 0.74344 | d = 0.2222 | n = 1.82496  $v_d$ = 23.8 |
| $r_2$ = 6.50724 | | |

Aspherical coefficient. power number
First surface

K = −5.22808D-01
A1 = 1.70286D-02      P1 = 4.0000
A2 = −2.00054D-03     P2 = 6.0000
A3 = −8.76135D-03     P3 = 8.0000
A4 = −1.85863D-02     P4 = 10.0000
$r_1/nf$ = 0.4074      d/f = 0.2222

$$\frac{(n-1)^3}{(NA)^4} \frac{\Delta 1}{f} = 0.1251$$

In spite of the fact that the lens in accordance with the present invention has an extremely simple construction as shown in FIG. 1, a spherical aberration including a cover glass C is almost completely corrected as shown in aberration views of embodiments in FIGS. 2 to 7, and the sine conditions are also corrected to the same extent as prior are spherical glass lenses comprising three lenses.

Furthermore, the working distance is long which is more than 0.45f and is well utilized for a regenerative optical system for directly driving an abjective lens for tracking.

In a lens having a diffraction limit performance, it is necessary to measure surface accuracy of aspherical surface with accuracy of 1/10 or less of wavelength. However, in a single lens in which sine conditions are well corrected, which has the diffraction limit performance and in which only one surface is formed into aspherical surface, it is possible to easily measure surface accuracy of a surface composed of a spherical surface, radius of curvature, on-the-axis thickness of lens, and refractive index. Supposing that these particulars are within the tolerance, it is possible to presume, with required accuracy, surface accuracy of the aspherical surface from the on-the-axis performance of lens measured by an interferometer or the like. Because of this, there provides a remarkable effect in dispensing with a costly aspherical surface measuring unit.

What is claimed is:

1. An objective lens for an optical disk comprising a positive meniscus lens or flat convex lens whose convex surface is directed towards the object and a surface on the object side is an aspherical surface, characterized in that the following conditions are satisfied:

$$0.38 < \frac{r_1}{nf} < 0.48$$

$$1.7 < n$$

$$0.08 < \frac{(n-1)^3}{(NA)^4} \frac{\Delta l}{f} < 0.15$$

where
f: focal length of whole system
n: refractive index of lens
$r_1$: vertex radius of curvature of surface on object side
NA: numerical aperture of lens
$\Delta 1$: difference in a direction of optical axis the extreme peripheral position of effective diameter of said aspherical surface between aspherical surface on the object side and the reference spherical surface having radius of curvature $r_1$ which contacts with the vertex of the aspherical surface, $\Delta 1$ is positive when radius of curvature of said aspherical surface becomes weak as it is moved away from the optical axis.

2. The objective lens of claim 1 wherein the following relation is satisfied:

$$0.2 < d/f < 0.75$$

where d is thickness of lens.

3. The objective lens of claim 1 shown by the following data:

| | | |
|---|---|---|
| f = 1.0 | NA = 0.50 | |
| $d_c$ = 0.2667 | M = 0 | WD = 0.6241 |
| $r_1$ = 0.75570 | d = 0.3333 | n = 1.82496  $v_d$ = 23.8 |
| $r_2$ = 7.20604 | | |

Aspherical coefficient. power number
First surface

K = −4.52123D-01
A1 = −5.40998D-03     P1 = 4.0000
A2 = −2.36933D-02     P2 = 6.0000
A3 = −2.41649D-02     P3 = 8.0000
A4 = −4.63059D-02     P4 = 10.0000
$r_1/nf$ = 0.4141      d/f = 0.3333

$$\frac{(n-1)^3}{(NA)^4} \frac{\Delta 1}{f} = 0.1183$$

4. The objective lens of claim 1 shown by the following data:

| | | |
|---|---|---|
| f = 1.0 | NA = 0.5 | |
| $d_c$ = 0.2667 | M = 0 | WD = 0.6269 |
| $r_1$ = 0.71995 | d = 0.3333 | n = 1.73814  $v_d$ = 27.5 |
| $r_2$ = 23.46794 | | |

Aspherical coefficient. power number
First surface

K = −4.19384D-01
A1 = −3.73982D-02     P1 = 4.0000
A2 = −7.06491D-02     P2 = 6.0000
A3 = −6.62687D-02     P3 = 8.0000
A4 = −1.31617D-01     P4 = 10.0000
$r_1/nf$ = 0.4142      d/f = 0.3333

$$\frac{(n-1)^3}{(NA)^4} \frac{\Delta 1}{f} = 0.1153$$

5. The objective lens of claim 1 shown by the following data:

| | | |
|---|---|---|
| f = 1.0 | NA = 0.5 | |
| $d_c$ = 0.2667 | M = 0 | WD = 0.6277 |
| $r_1$ = 0.70214 | d = 0.3333 | n = 1.70214  $v_d$ = 29.5 |
| $r_2$ = ∞ | | |

Aspherical coefficient. power number
First surface

K = −4.24200D-01
A1 = −4.75156D-02     P1 = 4.0000
A2 = −9.04006D-02     P2 = 6.0000
A3 = −8.79901D-02     P3 = 8.0000
A4 = −1.72387D-01     P4 = 10.0000
$r_1$ = nf = 0.4125    d/f = 0.3333

$$\frac{(n-1)^3}{(NA)^4} \frac{\Delta l}{f} = 0.1148$$

6. The objective lens of claim 1 shown by the following data:

| | | |
|---|---|---|
| f = 1.0 | NA = 0.50 | |
| $d_c$ = 0.2667 | M = 0 | WD = 0.5626 |
| $r_1$ = 0.77006 | d = 0.4444 | n = 1.82496  $v_d$ = 23.8 |
| $r_2$ = 8.55304 | | |

Aspherical coefficient. power number
First surface
K = −3.99415D-01
A1 = −2.12212D-02    P1 = 4.0000
A2 = −3.98149D-02    P2 = 6.0000
A3 = −3.65016D-02    P3 = 8.0000
A4 = −6.67369D-02    P4 = 10.0000
$r_1/nf$ = 0.4220    d/f = 0.4444

$$\frac{(n-1)^3}{(NA)^4} \frac{\Delta l}{f} = 0.1115$$

7. The objective lens of claim 1 shown by the following data:

| | | |
|---|---|---|
| f = 1.0 | NA = 0.50 | |
| $d_c$ = 0.2667 | M = 0 | WD = 0.4507 |
| $r_1$ = 0.80831 | d = 0.6667 | n = 1.82496  $v_d$ = 23.6 |
| $r_2$ = 25.11574 | | |

Aspherical coefficient. power number
First surface
K = −7.86967D-01
A1 = 6.75680D-02     P1 = 4.0000
A2 = 1.44711D-02     P2 = 6.0000
A3 = −9.21497D-03    P3 = 8.0000
A4 = −1.44904D-02    P4 = 10.0000
$r_1/nf$ = 0.4429    d/f = 0.6667

$$\frac{(n-1)^3}{(NA)^4} \frac{\Delta l}{f} = 0.0976$$

8. The objective lens of claim 1 shown by the following data:

| | | |
|---|---|---|
| f = 1.0 | NA = 0.50 | |
| $d_c$ = 0.2667 | M = 0 | WD = 0.6884 |
| $r_1$ = 0.74344 | d = 0.2222 | n = 1.82496  $v_d$ = 23.8 |
| $r_2$ = 6.50724 | | |

Aspherical coefficient. power number
First surface
K = −5.22808D-01
A1 = 1.70286D-02     P1 = 4.0000
A2 = −2.00054D-03    P2 = 6.0000
A3 = −9.76135D-03    P3 = 8.0000
A4 = −1.85863D-02    P4 = 10.0000
$r_1/nf$ = 0.4074    d/f = 0.2222

$$\frac{(n-1)^3}{(NA)^4} \frac{\Delta l}{f} = 0.1251$$

* * * * *